(12) United States Patent
Beach

(10) Patent No.: US 7,386,298 B2
(45) Date of Patent: Jun. 10, 2008

(54) METHOD AND APPARATUS FOR ROAMING ON A WIRELESS NETWORK

(75) Inventor: Robert Beach, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 620 days.

(21) Appl. No.: 10/883,294

(22) Filed: Jul. 1, 2004

(65) Prior Publication Data

US 2004/0242196 A1 Dec. 2, 2004

Related U.S. Application Data

(63) Continuation-in-part of application No. 09/528,697, filed on Mar. 17, 2000.

(51) Int. Cl.
H04M 1/66 (2006.01)
H04M 1/68 (2006.01)
H04M 3/16 (2006.01)

(52) U.S. Cl. .............. 455/410; 455/412.1; 455/422.1; 370/313; 370/331

(58) Field of Classification Search ............... 455/410, 455/411, 412.1, 412.2, 422.1; 370/313, 331
See application file for complete search history.

(56) References Cited

U.S. PATENT DOCUMENTS

| 5,046,082 | A | * | 9/1991 | Zicker et al. ............... 455/419 |
| 6,029,064 | A | * | 2/2000 | Farris et al. .............. 455/412.2 |
| 6,064,887 | A | * | 5/2000 | Kallioniemi et al. ........ 455/445 |
| 6,400,722 | B1 | * | 6/2002 | Chuah et al. ................ 370/401 |
| 6,947,408 | B1 | * | 9/2005 | Liberti et al. ................ 370/345 |
| 2004/0110506 | A1 | * | 6/2004 | Dent ........................... 455/437 |
| 2004/0152482 | A1 | * | 8/2004 | Raffel et al. ................. 455/522 |
| 2006/0190586 | A1 | * | 8/2006 | Stewart et al. .............. 709/223 |
| 2007/0038759 | A1 | * | 2/2007 | Hanson et al. .............. 709/227 |

* cited by examiner

*Primary Examiner*—Joseph Feild
*Assistant Examiner*—Inder Pal Mehra
(74) *Attorney, Agent, or Firm*—Ingrassia Fisher & Lorenz, P.C.

(57) ABSTRACT

The present invention provides a method for interfacing a mobile device with a system including a plurality of RF ports and a cell controller adapted to communicate a data signal with the mobile unit through the RF ports. The method includes associating the mobile device with a first RF port using at least one security parameter for communicating the data signal, receiving a request message from the mobile device to roam from the first RF port to a second RF port, and associating the mobile device with the second RF port without changing the at least one security parameter.

21 Claims, 4 Drawing Sheets

METHOD AND APPARATUS FOR ROAMING ON A WIRELESS NETWORK

CROSS-REFERENCE TO PRIOR APPLICATION

This application is a continuation-in-part of pending application Ser. No. 09/528,697, filed Mar. 17, 2000.

BACKGROUND OF THE INVENTION

1. Field of the Invention

This invention relates generally to communications systems, and, more particularly, to a method and apparatus for roaming on a wireless network.

2. Description of the Related Art

This invention relates to wireless data communications networks, and in particular to arrangements for communications between mobile data handling units and a central computer using wireless data communications.

The assignee of the present invention supplies a wireless data communications system known as the Spectrum24® System, which follows the radio data communications protocol of Institute of Electrical and Electronics Engineering (IEEE) Standard 802.11. In the system as implemented, mobile units are in data communication with a central computer through access points. The access points may communicate with a central computer or several computers over a wired network. Each of the mobile units associates itself with one of the access points.

The access points in this system perform the duties in the standard protocol, including, association, roaming, packet formulation, parsing, packet fragmentation, packet re-assembly, encryption, and system access control. To maintain order and reduce radio communications each access point determines which of the data communications received over the wired network from the central computer is addressed to a mobile unit associated with that particular access point. This requirement adds a significant computational burden to the access point, increasing the cost thereof. In addition, in applications that must support a high volume of data communications from multiple users, such as a self service shopping system, a hospital system, a systems that includes paging or voice data links to many users, or a system supporting communication with electronic shelf labels, additional access points are required to support the data communications traffic, increasing the overall system cost. The cost of an operational access point is dependent not only on the complexity thereof and the requirement for high speed processing of data packets for purposes of selecting those destined for mobile units associated with an access point, but also on the additional cost of the installation of electrical power to the location of the access point and the cost of a power supply to convert AC electrical power to DC power for the circuits of the access point. Further cost may be involved in physically mounting the access point hardware and antenna.

Current 802.11 implementations employ a lengthy, 12-15 packet exchange between a mobile unit and an access point when the mobile unit roams to the access point. Each access point operates independently of the others from a security standpoint. Hence, if the mobile device roams and wishes to transfer between access points, the lengthy association exchange is repeated between the mobile device and the new access point. The size of the exchange significantly affects the time required for a mobile unit to associate with access points. In latency sensitive applications, such as multimedia or voice over internet protocol (VOIP), the quality of the service may be affected by the significant roaming delay. Service interruptions may occur during the roaming process.

In prior systems, as discussed above, each access point is connected on a wired network (e.g., Ethernet) to the central computer. The access points determine the identity of mobile units that have become associated with them and extract from the data packets on the network those packets addressed to each mobile unit associated with the access point. This procedure generates a significant processing burden for the access points that increases cost for the access points.

Prior systems may also have a large number of access points, each with a memory containing program instructions for carrying out the various required functions. This distribution of program instructions makes it difficult to upgrade a system or to provide changes in system configuration, because any upgrade or change may require changes to the program instructions in each of the access points. Such distribution of processing functions also makes system management functions, such as load balancing or access control, more difficult.

The present invention is directed to overcoming, or at least reducing the effects of, one or more of the problems set forth above.

SUMMARY OF THE INVENTION

In one embodiment of the present invention, a method is provided for interfacing a mobile device with a system including a plurality of RF ports and a cell controller adapted to communicate a data signal with the mobile unit through the RF ports. The method includes associating the mobile device with a first RF port using at least one security parameter for communicating the data signal, receiving a request message from the mobile device to roam from the first RF port to a second RF port, and associating the mobile device with the second RF port without changing the at least one security parameter.

BRIEF DESCRIPTION OF THE DRAWINGS

The invention may be understood by reference to the following description taken in conjunction with the accompanying drawings, in which like reference numerals identify like elements, and in which.

Figure 1:
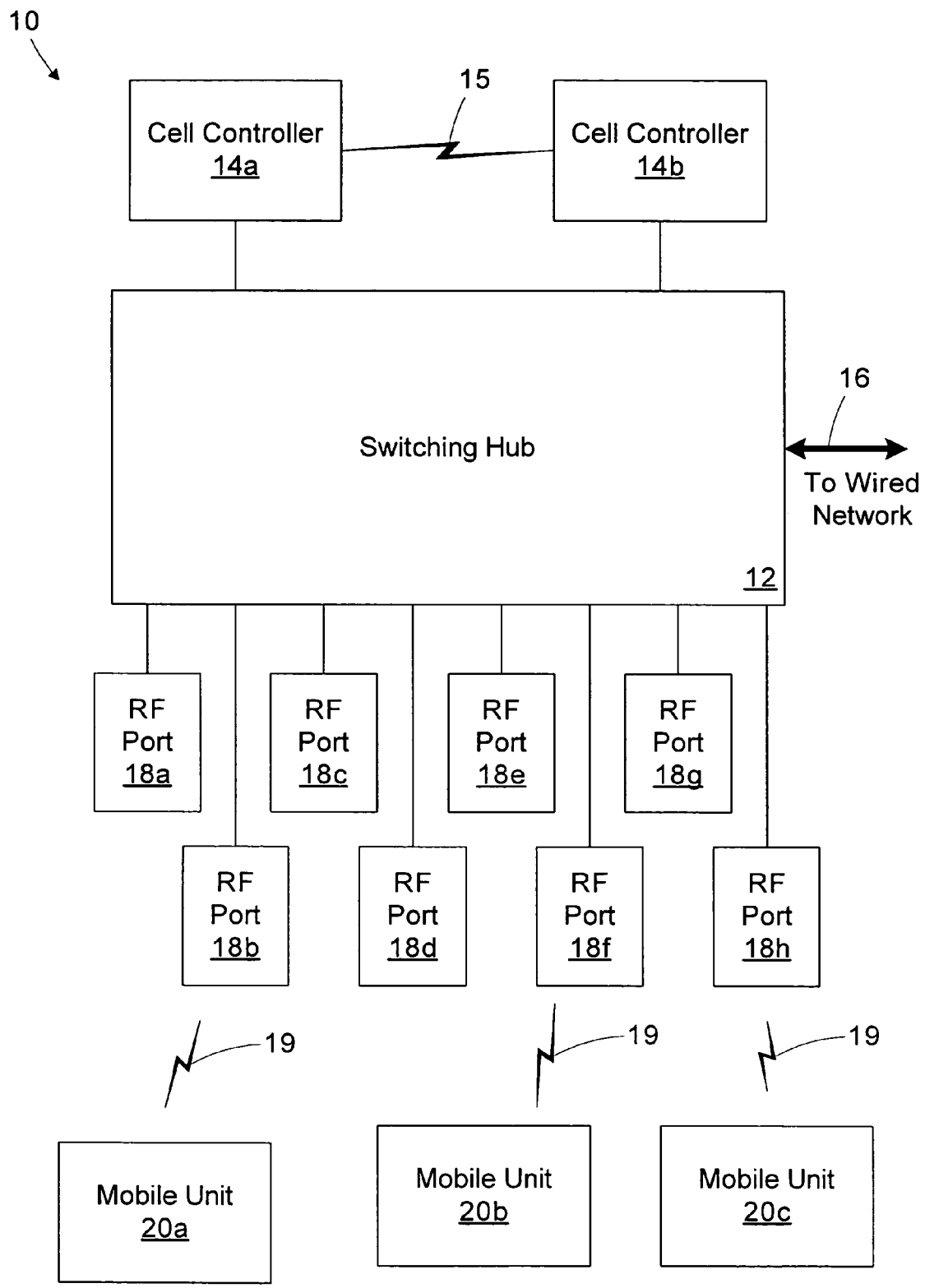
FIG. 1 is a block diagram of a wireless communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, there is shown one illustrative embodiment of a wireless data communications system 10 in accordance with the present invention. The data communications system 10 provides data communications between a central computer or a collection of computers on a wired network 16 and a plurality of mobile units 20(a-c). Exemplary mobile units 20(a-c) include notebook computers, personal data assistants (PDAs), VOIP phones, or other wireless devices. The data communications system 10 of FIG. 1 uses simplified, relative to the prior systems described above, RF ports 18(a-h) to provide radio packet communications with the mobile units 20(a-c). For ease of illustration, unless a particular mobile unit or RF port is referenced, the mobile units 20(a-c) and RF ports 18(a-h) are referred to hereinafter as simply the mobile units 20 and the RF ports 18.

The RF ports 18 employ a wireless communications protocol, such as one of the 802.11x standards that have been ratified by the Institute of Electrical and Electronics Engineering (IEEE). Exemplary IEEE 802.11x standards include 802.11, 802.11a, 802.11b (also known as Wi-Fi), and 802.11g. Although the invention is described as it may be implemented for an 11 Mbit/sec 802.11 system, it could also be applied to later standards in the 802.11 family with higher bandwidths.

Radio modules (not shown) in the mobile units 20 monitor beacon signals from the RF ports 18, which are originated by the cell controllers 14, and associate with an RF port 18 over wireless links 19. The present invention is effective in a large wireless local area network (LAN) system wherein it may be necessary to provide a large number of radio access locations. Typically, such systems, operating at low power microwave frequencies, require radio access locations at about every 100 feet. Where the wireless LAN system operates with mobile units located throughout a large facility, such as a business, hospital complex, or university campus, many such radio access locations may be required, possibly several hundred.

According to the present invention, the system configuration and operation are redesigned to reduce the cost of each individual radio access point. In addition, the system of the present invention provides a concentration of operational control in one or more cell controllers 14(a-b), making management of the system easier and making modifications and upgrades easier to install. The cell controllers 14(a-b) are hereinafter referred to as cell controllers 14 unless a specific cell controller 14 is referenced.

The present invention moves much of the functionality of the 802.11 protocol from the device located at the radio access location and places it in the cell controller 14. The cell controller 14 may be used in conjunction with a switching hub 12 connected to the wired network 16 with which the wireless network 10 is associated. The RF port 18 may have RF functionality similar to that used in a conventional access point, but has simplified digital circuits to perform only a limited portion of the 802.11 media access control (MAC) functions. In the illustrated embodiment, the RF port 18 performs functions of the access point that may be time critical, but generally require a lower level of processing resources (e.g., processor capacity, software complexity, and memory capacity). Other functions that are more processor-intensive and may require more complex programming are delegated to the cell controller 14. Such functions may be less time critical. The cell controller 14 may perform these more complex functions for a plurality of RF ports 18.

To perform the higher level processing functions of an access point in the cell controller 14, according to the present invention, all messages directed to or from mobile units 20 associated with a particular RF port 18 are processed in the cell controller 14. A system may have one or more cell controllers 14, which may comprise, e.g., Pentium® board level computers offered by Intel Corporation of Santa Clara, Calif. Each cell controller 14 may be arranged and programmed to handle data message traffic and mobile unit associations for a selected plurality of RF ports 18. A switching hub 12 may be interposed to provide message switching on a wired network connected to a communications line 16, RF ports 18, and cell controllers 14. In applications using multiple cell controllers 14, a secure connection 15 (e.g., wired, wireless, or through the switching hub 12) may be provided for communication between the cell controllers 14.

Each cell controller 14 acts as a "virtual" access point for traffic addressed to its associated RF ports 18 and to the mobile units 20 associated with those RF ports 14. When a message addressed to a mobile unit 20 is received on the line 16, the switching hub 12 directs the message to the appropriate cell controller 14, which reformats the message into a data signal and relays the message to the appropriate RF port 18, again through switching hub 12. When the message is received by an RF port 18, it is converted to a radio message and sent to the mobile unit 20 with a minimum of processing. Likewise, when a message is received from a mobile unit 20 by an RF port 18, it is converted to a digital message packet and relayed to the cell controller 14 associated with the RF port 18 through the switching hub 12. The cell controller 14 parses the message for further relay in the system.

Association between the mobile units 20 and the RF ports 18 is a function handled by the cell controller 14. The cell controller 14 periodically directs the RF port 18 to broadcast beacon signals. When a mobile unit 20 first becomes active, it sends an association request signal in response to a beacon signal sent by an RF port 18. The association request signal is relayed by the RF port 18 to the cell controller 14, which performs the processing required for association, including consideration of RF port loading. The cell controller 14 generates appropriate response signals to be sent by the RF port 18 to the mobile unit 20. The cell controller 14 may evaluate the loading of the RF ports 18 under its control and may perform load leveling functions, for example, by providing a message to RF port 18 accepting or declining an association request. In addition, the cell controller 14 may receive load messages from other cell controllers 14 in the system 10 and thereby coordinate overall load management. As a mobile unit 20 moves from a location serviced by one RF port 18 to a location serviced by a different RF port 18, the cell controller 14 receives information from the mobile unit 20 indicative of its reception of beacon signals from the various RF ports in the system and performs the functions that support roaming of mobile unit 20.

While in the data communications system 10 of FIG. 1, the cell controllers 14 are shown as separate computers connected to the switching hub 12, the term "cell controller" is intended to refer to the logical functions performed by these computers rather than the computers themselves. As will become apparent, the cell controller 14 may be implemented in a variety of ways other than as shown in the exemplary system 10 of FIG. 1. For instance, multiple cell controllers 14 can reside on a single computer or a single cell controller 14 might be distributed across two or more computers. Still other variations may be employed.

As mentioned above, implementation of a simplified RF port 18 may be achieved by performing "higher level" functions of the 802.11 protocol Media Access Control (MAC) in the cell controller 14 and performing "lower level" functions in a simplified RF port 18. The lower level functions are those that are hardware intensive and often time critical. The higher level functions are those that are software intensive and not time critical. One possible division of the exemplary 802.11 MAC functions is as follows:

Lower Level Functions (may be Performed at the RF Port 18)
    Cyclic Redundancy Check (CRC)
    Network Activity Vector (NAV)
    Ready to Send/Clear to Send (RTS/CTS)
    Header generation/parsing
    Collision Avoidance
    Frequency Hopping
    Ack parsing/generating
    Retransmission timeout Higher Level Functions (may be Performed at the Cell Controller 14)
    Association processing
    Roaming
    Retransmission
    Rate Control
    Host Interface The following optional (higher or lower) level MAC functions can be placed in either the higher or lower level categories.
    Wired Equivalent Privacy encryption/decryption (WEP)
    Fragmentation/Reassembly
    Data Movement
    Power Save Polling Support (PSP)

According to one arrangement of the system of the invention, the lower level MAC functions are provided at the RF port 18, the higher level MAC functions are provided in the cell controller 14 and the optional level functions can be provided at either the cell controller or the RF port 18.

A major advantage of the invention is a cost savings in hardware, processor capacity, and storage capacity for the RF port 18. Since a system with, for example, one hundred or more radio access locations may be implemented with one or two cell controllers 14, the processor hardware and memory required for the higher level MAC functions need be provided only at the cell controllers 14. In fact, the capabilities of the overall system, for WEP encryption and other special functions, can be increased at modest cost by using a high performance, board-level personal computer or even a host computer as a cell controller 14. By eliminating the higher level MAC functions from the radio access locations, the cost of the devices installed at those locations can be significantly reduced because of lower processor capacity and storage.

In connection with association and roaming functions, the RF ports 18 provide beacon signals in response to commands generated by the cell controller 14. When an association sequence is initiated by a mobile unit, the RF port 18 relays the association messages between the mobile unit 20 and the cell controller 14 during the association process, which is handled by the cell controller 14.

In conventional access point systems, when a mobile unit 20 roams from one access point to another, it must initiate a lengthy re-association process, because the access points do not have a trust relationship. However, in accordance with the present invention, the cell controller 14 performs the higher level protocol functions, including the association process, and directs messages to the appropriate RF port 18. Hence, the cell controller 14 can transfer responsibility from one RF port 18 to another RF port 18 in support of a roaming operation without repeating the lengthy (i.e., 12-15 packet) exchange.

During a typical association process, security parameters, such as an authentication key used to verify the identity of the mobile unit 20 and an encryption key used to encrypt data exchanged with the mobile unit 20, are assigned to each mobile unit 20. When a mobile unit 20 first associates with an RF port 18, a complete roaming exchange (e.g., 12-15 packets) is completed, resulting in a secure data channel in which data packets are encrypted and authenticated. When the mobile unit 20 roams, it selects a particular RF port 18 to which it desires to roam based on the beacon signals it receives from nearby RF ports 18. The mobile unit 20 sends a roaming request data packet to the RF port including a request to roam to the selected RF port 18. The selected RF port 18 accepts the roaming request packet and forwards it to the cell controller 14. In the illustrated embodiment, the roaming request packet is a standard 802.11 data packet, but includes a designated Ethernet type value and/or additional data fields to indicate the roam request. The packet is encrypted and authenticated using the previously assigned encryption and authentication keys.

Upon receiving the roaming request packet, the cell controller 14 analyzes the packet, and, if it accepts the request, sends a second confirmation data packet to the mobile unit 20 via the new RF port 20 indicating that the request has been accepted and implemented. Again, the roaming confirmation packet is a standard 802.11 data packet with a special Ethernet type value and/or additional data fields to indicate the roaming confirmation. The packet is encrypted and authenticated using the same assigned security key(s) (e.g., encryption and authentication keys) that had been used for communication with the previous RF port 18.

Using a two packet exchange, the cell controller 14 allows the mobile unit 20 to roam from one RF port 18 to a different RF port 18 without requiring a lengthy re-association exchange. This reduction in packets reduces the delay experienced by the mobile unit 20 during time-sensitive operations. The reduced length exchange also reduces overall traffic on the wireless data communications system 10.

The mobile unit 20 may implement a conventional 12-15 packet association sequence if it wishes or does not include the reduced packet functionality. Likewise, the cell controller 14 may reject a roam request and force a conventional 12-15 packet association sequence.

In embodiments using multiple cell controllers 14A, 14B, the roaming exchange may be implemented across cell controllers 14A, 14B as well as across RF ports 18. A cell controller 14A associated with a first RF port 18D may receive a roam request packet from a mobile unit 20B requesting to roam to an RF port 18F associated with a different cell controller 14B. The cell controller 14A may transfer the roaming request message including the appropriate connection information (e.g., authentication and encryption keys) to the cell controller 14B over the secure connection 15. Hence, the cell controllers 14A, 14B can share a trust relationship. The cell controller 14B, after accepting the connection with the mobile unit 20B, sends the roaming confirmation packet through the RF port 1SF to complete the roaming transfer. Again, the roaming operation is completed using only a two packet exchange with the mobile unit 20B. The handoff between the cell controllers 14A, 14B and RF ports 18D, 18F is transparent to the mobile unit 20B.

In connection with message traffic to a mobile unit 20, message packets are routed by switching hub 12 to the cell controller 14 responsible for the mobile unit 20 addressed. The message is buffered and formatted by the cell controller 14 and in a preferred arrangement encapsulated by the cell controller 14 as a mobile unit packet within a wired network packet addressed to the responsible RF port 18. This packet is routed to the RF port 18. The RF port 18 extracts the mobile unit packet from the message and sends the packet to mobile unit 20 as a radio signal. The RF port 18 may also provide a CRC calculation and generate CRC data to be added to the message. The mobile unit 20 responds with an acknowledgment signal to the RF port 18, which generates and sends an acknowledgment status message to cell controller 14.

In connection with messages for systems connected to the wired network 16, the mobile unit 20 sends a packet to the RF port 18 by radio signal. The RF port 18 filters received radio message packets according to the BSS (Basic Service Set) identifier in the packet and, if the packet has a BSS identifier associated with the RF port 18, performs the CRC check as the packet is received. The RF port 18 then generates and sends an acknowledgment signal to the mobile unit 20 and sends the received packet to the cell controller 14. The cell controller 14 buffers, parses and, if necessary, decrypts the packet and routes the packet to the host on the network 16 through the hub 12.

The physical arrangement of an RF port 18 may be identical to current access points used in the Spectrum24® system with some of the access point software being non-functional. The RF ports 18 may also be simplified to reduce cost and power consumption. To reduce installation expenses the RF ports 18 may be powered via an Ethernet cable, which also connects the RF ports 18 to the switching hub 12 or to the cell controller 14. The RF ports 18 can be arranged in a small package (e.g., portable radio size) with integrated diversity antennas and arranged for easy mounting, such as by adhesive tape or a hook and loop fastener. Connection to the switching hub 12 is by Ethernet cable, which is also provided with D.C. power. For example, a choke circuit, such as a Pulse Model PO421 may be used, as described in the above referenced International Application. The choke circuit may be built into an Ethernet connector and is available in this configuration.

Figure 3:
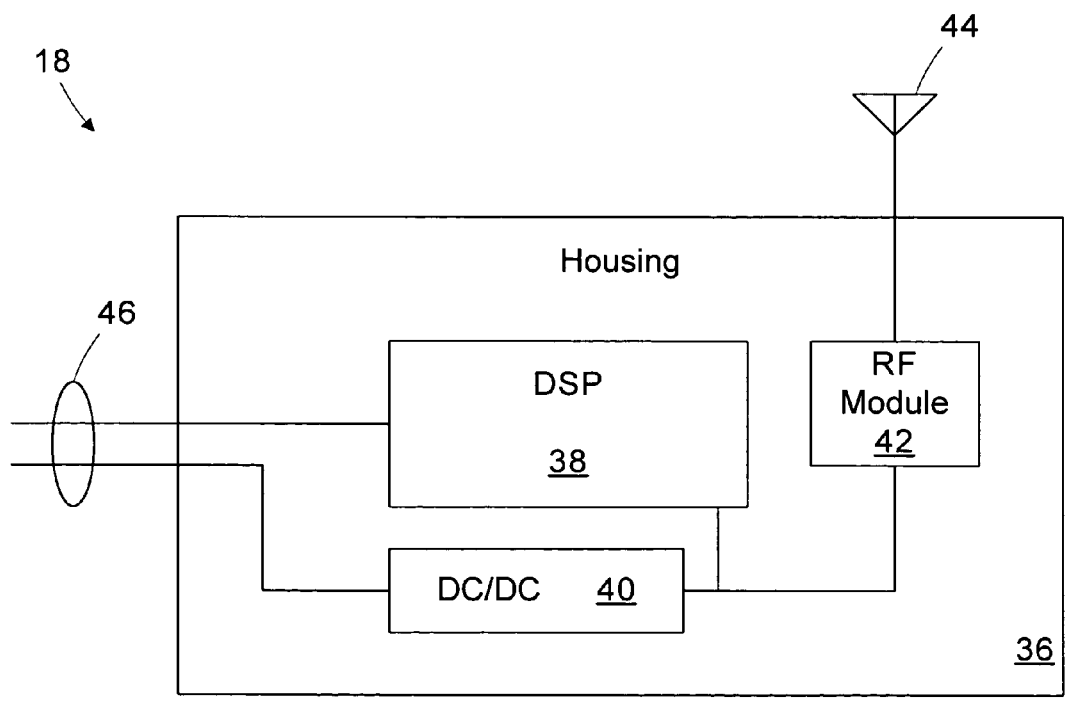
FIG. 3 is a block diagram illustrating one embodiment of an RF port for the system of FIG. 1.

The RF port 18 does not have to perform Ethernet address filtering and does not have to perform 802.11 association and roaming functions and can, therefore, have a lower level of processor capacity, software support, memory, and power consumption. In one embodiment, shown in FIG. 3, the RF port 18 includes a digital signal processor (DSP) 38 that includes internal RAM and ROM (not shown). An exemplary DSP 38 that may be used is one of the Texas Instruments TMS 320 family of DSP processors, such as the 5000 series, specifically the TMS 320 VC 5402. The DSP 38 provides an interface between the Ethernet cable 46 and the RF module 42 in RF port 18, as shown in FIG. 3. The RF module 42 is provided in a housing 36 with the DSP 38, a DC/DC power supply 40, and one or more antennas 44. The RF module 42 includes a 3860 or 3861 baseband processor, such as an HFA 3860B, to interface with the digital portion of the RF port 18, specifically the DSP 38. In one arrangement, the ROM memory of the DSP 38 can be provided with "bootloader" firmware that downloads the necessary DSP software instructions from the cell controller 14 upon startup of the RF port 18 and loads the instruction into the RAM of the DSP 38.

An exemplary processor that may be used to perform the lower level MAC functions is the TMS320VC5402. These two parts are functionally identical except for differences in power consumption. Of course, other processors, including newer versions in the same family, may be used. The basic configuration of the VC5402 is:

100 MIPS execution rate

8 KB on chip ROM (organized as 4K×16 bits)

32KB on chip RAM (organized as 16K×16 bits)

Two 16 bit timers with 1 µs or better resolution

Two High speed, full duplex serial ports (up to 50 Mbits/sec each) with smart DMA channel support One High speed 8 bit wide host/parallel port (160 Mbit/sec)

Six DMA channels for general purpose use 16 bit external memory/IO Bus with internal wait state generation 16 interrupts with 3 instruction (30 ns) worst case latency 0.54 mW/MHz power consumption (30 mA@1.8 v at 100 MHz)

Low Power Modes (6 mA, 2 mA, 2 ÿA depending on setting)

Internal PLL that generates the system clock with an external crystal

The following section describes the use of a 5402 DSP 38 as a MAC engine for 11 Mbit/sec 802.11 DS systems. It could also be used in FH systems as well. The following illustration focuses on the how the 5402 interfaces to the Intersil 3860/1 baseband processor in the RF module 42 and how it implements the lower level MAC functions.

Figure 4:
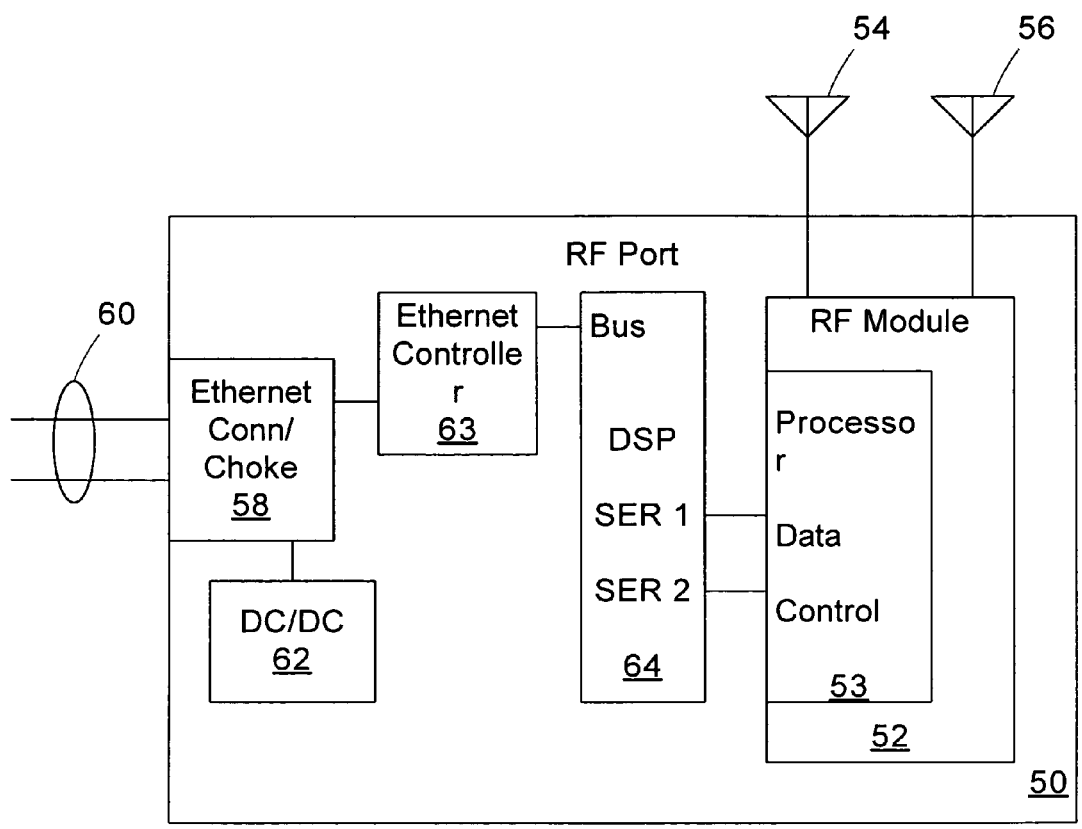
FIG. 4 is a more detailed block diagram of the RF port of FIG. 3.

A first issue is how the 5402 DSP 38 interfaces to the 3861 (much of what is described also applies to the 3860) and the rest of the RF module 42. As shown in FIG. 4, the processor 53 in the RF module 52 of the RF port 50 has 2 major interfaces, both serial. The first interface, labeled DATA, is used to transfer data between the MAC engine comprising the DSP 64 and the processor 52. The DATA interface has four lines: TxD, TxC, RxD, and RxC and operates at up to 11 Mbits/sec. The exact rate depends on the transfer rate of the packet. The clock signals of both interfaces are generated by the processor 53 and so transfers are controlled by the processor 53. Both can be halted at any time by the processor 53 and also that rate may be changed. The second serial interface, labeled CONTROL is used to load commands into the processor 53 and read status information from the processor 53. This interface is a 4-wire bidirectional interface using one data line, one clock line, one "direction control" line, and a chip select line. This serial interface also can operate at up to 11 Mbits/sec. In addition to the serial interfaces, there are additional control and status lines such as Reset, TX_PE, RX_PE, TX_RDY, etc.

The DSP 64 has two sets of full duplex serial interfaces that are capable of operation up to 50 Mbits/sec (given a 100 MHz clock). They can be clocked using internal or external sources. In this design one of the sets of serial interfaces, labeled SER1, is used to connect to the high speed data lines of the processor 53. The DSP 64 interfaces have the same basic lines (RxD, RxC, TxD, TxC) as does the processor 53, hence they connect with minimal trouble. Although the DSP 64 uses 1.8 v for its core voltage, its I/O lines are 3.3 v tolerant and so can interface to the processor 53 without converters. In addition, they are fully static and can deal the start/stop operation of the clock lines from the processor 53.

Data transfer will be done under DMA control within the DSP 38 using a mode referred to as "Auto Buffering Mode" by Texas Instruments. This mode provides essentially dedicated DMA channels for each serial port interface (two DMA channels per serial port interface). These channels access an independently operating bank of SRAM and so transfers have no impact on CPU performance. The CPU can start transfers in either direction and be notified via interrupt on their completion.

Interfacing to the control serial port on the processor 53 can be done in three different ways. The first, illustrated in FIG. 4, utilizes the second serial port, labeled SER 2 on the DSP 64 with a small amount of combinatorial logic/buffering to convert between the single data line of the processor 53 and the dual data lines of the DSP 64. Another approach is to use an external shift register that would perform serial/parallel conversion. This register would sit on the I/O bus of the DSP 64 and would be loaded/read by the DSP 64 and data shifted between it and the processor 53. The third approach is to use an external buffer/latch on the DSP 64 I/O bus and "bit bang" the clock/data lines to the processor 53.

The second or third approaches free up the second serial channel for more other use such as providing high speed serial interfaces such as Ethernet or Universal Serial Bus (USB) and, in some applications, would have advantages over the first. All require a small amount of external combinatorial logic and so the cost of all solutions is about the same. The same logic would apply to interfacing to the synthesizer. It is accessed even less often than the control port of the processor 53 and so a "bit banging" approach would work fine.

Finally, interfacing to the various control and status lines presented by the processor 53 can be done via a simple bidirectional register/latch connected to the I/O bus of the DSP 64. The DSP 64 can read/write this register as it needs to control and monitor the processor 53. It would be possible to combine all control/monitor functions (including the serial control interface) into a single 16 bit buffered register latch. Parallel control/status lines would be connected to particular lines of this latch. Serial control interfaces would also be connected and "bit banged" as necessary to move data between the DSP 64 and the processor 53.

The arrangement shown in FIG. 4 uses a Crystal CS 8900 A Ethernet controller 63 coupled to the parallel port of the DSP 64 to interface to the Ethernet port 58. An Ethernet connector/choke 58 receives a cable 60 and provides DC power from the cable 60 to the DC/DC power supply 62. The RF port 50 shown in FIG. 4 includes spaced diversity antennas 54, 56 to improve reception in multipath conditions.

In the system of FIG. 1, the cell controller 14 is a board level personal computer coupled to the switching hub 12 preferably by 10 M bit and 100 Mb Ethernet ports. For smaller systems, a 350 MHz Pentium® computer with 16 MB RAM may be used. For larger systems having many RF ports a 500 MHz Pentium® with 64 MB RAM is appropriate. Communications to and from the wired network are preferably carried out at 100 MHz. Communications to and from the RF ports 18 may be carried out at 10 MHz. A second cell controller 14 may be supplied for larger systems and/or to provide backup in the event one cell controller 14 fails. Reliability can be enhanced by providing dual fans and dual power supplies. A flash disk memory may be used for reliability. Alternately, the cell controller 14 may be built into the switching hub 12 or into a host processor.

The operating system for the cell controller 14 may be a real time operating system, such as VRTX or QNX, which provides multitasking, a full network stack, and utilities. Web based management utilities, which are client side java based, are provided for maintaining the configuration of the cell controller 14, the RF ports 18 and status of the mobile units 20.

The cell controller 14 includes applications to provide mobile unit association management, roaming and packet buffer management. These applications are similar to those performed by current access points in the Spectrum24® system, with the exception of the simplified roaming protocols described above. The cell controller 14 may also provide QoS support, user authorization and configuration management. Placing these functions on a personal computer cell controller facilitates system management and program updates using available programming tools. Further, modifications to authorization or management functions need only be installed into the cell controller 14, and no modification to the software of the RF ports 18 is required.

The cell controllers 14 handle routing of all messages to or from the mobile unit 20. The cell controller 14 buffers message packets received from the wired network, determines the appropriate RF port 18 with which the addressed mobile unit 20 is associated, and sends the packet to the RF port 18. The cell controller 14 can additionally perform WEP encryption/decryption and the CAC associated therewith.

The cell controller 14 may also perform the additional function of maintaining and downloading firmware to the RF ports 18. Upon power up, the RF ports 18 use a bootloader routine stored in ROM to send a download request to cell controller 14. The cell controller 14 then downloads firmware to the RF port 18, including configuration information such as channel assignment, ESS, and BSS identification. The cell controller 14 and the RF ports 18 additionally share a common TSF clock.

The mobile unit computer 22 of mobile unit 20 is provided with similar software to perform the higher level MAC functions as outlined above. Advantageously, the software 34 can be programmed using the same operating system as provided for the computer, and thereby provide a user interface, such as a Microsoft® Windows® interface, which is familiar to the user. The mobile unit software 34 provides the MAC functions of header building, roaming, and association. The mobile unit computer 22 may also download firmware to the processor in the WLAN adapter 24.

As evident from the forgoing description, the hardware for RF port 18 and the WLAN adapter 24 of the mobile unit 20 can be substantially similar, with the possible exception of the interface to an Ethernet network or to a mobile unit host. Further, the logical cell controller function and the higher order MAC functions performed by the mobile unit host processor can be performed on any computer system.

Using the RF port 18 of the present invention coupled to a computer system, it is possible to provide either a mobile unit 20 or a wireless network according to the software provided. Since the software for RF port 18 may be downloaded from a host system, a simple combination of a computer and one or more RF ports 18 can function as either a WLAN mobile unit, a WLAN host, or both, by providing a function selectable firmware to the processor in the RF port 18.

Figure 5:
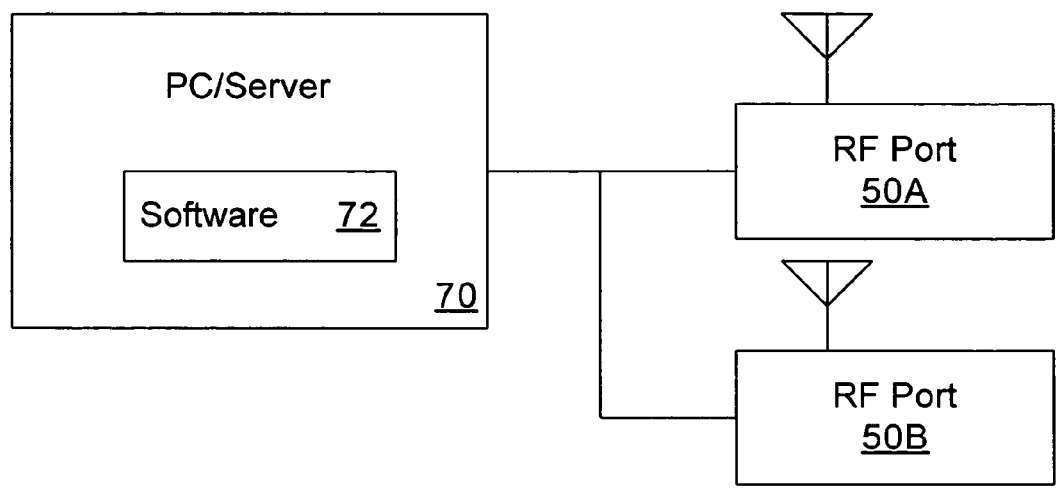
FIG. 5 is a block diagram of an arrangement of a computer and an RF port for providing a simplified wireless local area network according to the present invention.

In the arrangement shown in FIG. 5, a personal computer 70 is provided with software 72 and connected to one or more RF ports 50A, 50B to provide a complete host system for wireless data communications. This arrangement could be used, for example, in a small business wherein office equipment is connected to server 70 by a wired network for conventional LAN operation, and one or more RF ports 50 are also connected to the server 70 on the LAN system to provide data communications between the server 70 and mobile units. The server 70 can perform the higher order MAC functions and download firmware instructions to the RF ports 50. Alternatively, the firmware instructions can be installed on PROM memory in the RF ports 50.

Figure 2:
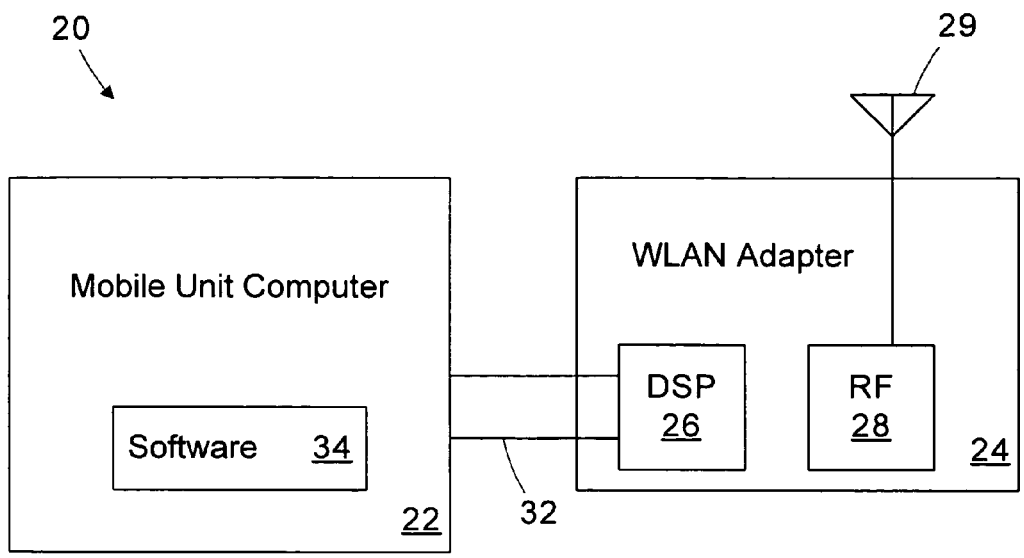
FIG. 2 is a block diagram illustrating one embodiment of a mobile unit arranged to be used in the system of FIG. 1.
Figure 6:
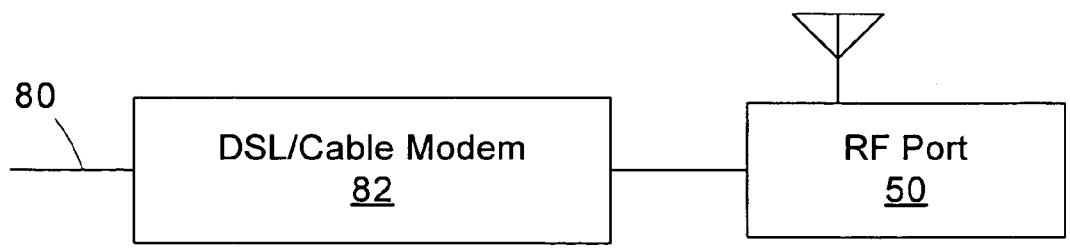
FIG. 6 is a block diagram of an arrangement for providing wireless access to the Internet using an RF port of the present invention.

FIG. 6 shows an arrangement for providing wireless access to the Internet using the RF port 50 of the present invention. Internet access over a communications line 80 to a modem 82 may be provided by cable, DSL or fiber optical transmission. The RF port 50 may be provided with MAC firmware on a PROM or may be configured with a bootloader program to download firmware from an ISP server. When installed in a home or office, mobile units 20 can associate with the RF port 50 to initiate Internet access. The ISP server may perform the higher level MAC function, or they may be provided in RF port 50. The mobile units 20 may be personal computers 22 in a home or office with a WLAN adapter 24 as shown in FIG. 2.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for interfacing a mobile unit with a system that includes a plurality of RF ports and a first cell controller, the method comprising:
   associating, by the first cell controller, the mobile unit with a first RF port of the plurality of RF ports using at least one security parameter for communicating data signals, wherein the first RF port is associated with the first cell controller;
   relaying, by the first cell controller, a first data message addressed to the mobile unit to the first RF port for conversion into a first radio message by the first RF port;
   performing roaming functions by the first cell controller, wherein the roaming functions include receiving, by the first cell controller, a first request message from the mobile unit to roam from the first RF port to a second RF port of the plurality of RF ports, wherein the second RF port also is associated with the first cell controller;
   associating, by the first cell controller, the mobile unit with the second RF port without changing the at least one security parameter parameter; and
   relaying, by the first cell controller, a second data message addressed to the mobile unit to the second RF port for conversion into a second radio message by the second RF port.

2. The method of claim 1, further comprising sending a confirmation message to the mobile unit responsive to associating the mobile unit with the second RF port.

3. The method of claim 2, wherein receiving the first request message further comprises receiving a first packet and sending the confirmation message further comprises sending a second packet.

4. The method of claim 3, further comprising completing roaming from the first RF port to the second RF port using only the first and second packets.

5. The method of claim 1, wherein associating the mobile unit with the first RF port further comprises assigning at least one security key as the at least one security parameter.

6. The method of claim 5, wherein assigning the at least one security key further comprises assigning at least one of an authentication key and an encryption key.

7. The method of claim 1, wherein the at least one security parameter further comprises a security key, and the method further comprises:
   processing the data signal signals that are communicated with the mobile unit through the first RF port with the security key; and
   processing the data signal communicated with the mobile unit through the second RF port with the security key.

8. The method of claim 1, wherein the system includes a second cell controller, and the method further comprises:
   receiving, by the second cell controller, a second request message from the mobile unit to roam to a third RF port of the plurality of RF ports, wherein the third RF port is associated with the second cell controller;
   transferring the at least one security parameter from the first cell controller to the second cell controller; and
   associating, by the second cell controller, the mobile unit with the third RF port and with the second cell controller without changing the at least one security parameter.

9. The method of claim 8, wherein transferring the at least one security parameter further comprises transferring the at least one security parameter from the first cell controller to the second cell controller over a secure connection.

10. The method of claim 1, further comprising the first cell controller performing at least some functions selected from a group of functions that includes association processing, retransmission, rate control, and host interface.

11. The method of claim 1, further comprising:
   each of the plurality of RF ports performing at least some functions selected from a group of functions that includes cyclic redundancy check, network activity vector, ready to send/clear to send, header generation/parsing, collision avoidance, frequency hopping, ack parsing/generation, and retransmission timeout.

12. A method for interfacing a mobile unit with a system that includes a plurality of RF ports and a cell controller, the method comprising:
   establishing, by the cell controller, a first connection between the mobile unit and the cell controller through a first RF port of the plurality of RF ports using at least one security parameter, wherein the first RF port is associated with the cell controller;

relaying, by the cell controller, a first data message addressed to the mobile unit to the first RF port for conversion into a first radio message by the first RF port;

performing roaming functions by the cell controller, wherein the roaming functions include receiving, by the cell controller, a request message from the mobile unit to roam from the first RF port to a second RF port of the plurality of RF ports, wherein the second RF port also is associated with the cell controller, and wherein the roaming functions also include the cell controller sending a confirmation message to the mobile unit when the cell controller accepts the request;

establishing, by the cell controller, a second connection between the mobile unit and the cell controller through the second RF port without changing the at least one security parameter; and relaying, by the cell controller, a second data message addressed to the mobile unit to the second RF port for conversion into a second radio message by the second RF port.

13. A system, comprising:

a plurality of RF ports associated with a first cell controller, wherein each of the plurality of RF ports is for converting data signals received from the first cell controller into first radio messages, sending the first radio messages to a plurality of mobile units, receiving second radio messages from the plurality of mobile units, converting the second radio messages into digital message packets, and relaying the digital message packets to the first cell controller; and the first cell controller for associating a mobile unit of the plurality of mobile units with a first RF port of the plurality of RF ports using at least one security parameter for communication between the first cell controller and the mobile unit, for relaying first data signals of the data signals to the first RF port, for performing roaming functions that include receiving a first request message from the mobile unit to roam from the first RF port to a second RF port of the plurality of RF ports, wherein the second RF port also is associated with the first cell controller, for associating the mobile unit with the second RF port without changing the at least one security parameter, and for relaying second data signals of the data signals to the second RF port.

14. The system of claim 13, wherein the first cell controller is further for sending a confirmation message to the mobile unit responsive to associating the mobile unit with the second RF port.

15. The system of claim 14, wherein the first request message further comprises a first packet and the confirmation message further comprises a second packet.

16. The system of claim 15, wherein the first cell controller is further for completing roaming from the first RF port to the second RF port using only the first and second packets.

17. The system of claim 13, wherein the at least one security parameter further comprises at least one security key.

18. The system of claim 17, wherein the at least one security key further comprises at least one of an authentication key and an encryption key.

19. The system of claim 13, wherein the at least one security parameter further comprises a security key, and the first cell controller is further for processing, with the security key, the first data signals associated with the first radio messages that the first RF port sends to the mobile unit, and for processing, also with the security key, the second data signals associated with first radio messages that the second RF port sends to the mobile unit.

20. The system of claim 13, wherein the system further includes a second cell controller, wherein a third RF port is associated with the second cell controller, and the first cell controller is further for transferring the at least one security parameter to the second cell controller, and the second cell controller is for associating the mobile unit with the third RF port without changing the at least one security parameter.

21. The system of claim 20, further comprising a secure connection coupling the first cell controller to the second cell controller.

* * * * *

UNITED STATES PATENT AND TRADEMARK OFFICE
CERTIFICATE OF CORRECTION

PATENT NO. : 7,386,298 B2  Page 1 of 1
APPLICATION NO. : 10/883294
DATED : June 10, 2008
INVENTOR(S) : Beach et al.

It is certified that error appears in the above-identified patent and that said Letters Patent is hereby corrected as shown below:

In Column 7, Line 16, delete "1SF" and insert -- 18F --, therefor.

In Column 12, Line 5, in Claim 1, after "security" delete "parameter".

In Column 12, Line 30, in Claim 7, after "data" delete "signal".

Signed and Sealed this

Twenty-first Day of September, 2010

David J. Kappos
*Director of the United States Patent and Trademark Office*